(12) United States Patent
Mao et al.

(10) Patent No.: US 12,205,346 B2
(45) Date of Patent: Jan. 21, 2025

(54) SYSTEM FOR THREE-DIMENSIONAL GEOMETRIC GUIDED STUDENT-TEACHER FEATURE MATCHING (3DG-STFM)

(71) Applicant: Guangzhou Xiaopeng Autopilot Technology Co., Ltd., Guangdong (CN)

(72) Inventors: Runyu Mao, Guangdong (CN); Chen Bai, Guangdong (CN); Yatong An, Guangdong (CN); Cheng Lu, Guangdong (CN)

(73) Assignee: Guangzhou Xiaopeng Autopilot Technology Co., Ltd., Guangdong (CN)

( * ) Notice: Subject to any disclaimer, the term of this patent is extended or adjusted under 35 U.S.C. 154(b) by 428 days.

(21) Appl. No.: 17/696,993

(22) Filed: Mar. 17, 2022

(65) Prior Publication Data

US 2023/0298307 A1     Sep. 21, 2023

(51) Int. Cl.
| | |
|---|---|
| *G06K 9/00* | (2022.01) |
| *G06F 17/18* | (2006.01) |
| *G06V 10/75* | (2022.01) |
| *G06V 10/776* | (2022.01) |
| *G06V 10/778* | (2022.01) |

(52) U.S. Cl.
CPC ............ *G06V 10/751* (2022.01); *G06F 17/18* (2013.01); *G06V 10/776* (2022.01); *G06V 10/778* (2022.01)

(58) Field of Classification Search
None
See application file for complete search history.

(56) References Cited

U.S. PATENT DOCUMENTS

| | | | | |
|---|---|---|---|---|
| 2023/0046088 A1* | 2/2023 | Wu | ........................ | G06V 20/00 |
| 2023/0111306 A1* | 4/2023 | Anand | .................. | G06T 7/0014 |
| | | | | 382/128 |
| 2023/0153943 A1* | 5/2023 | Kuen | .................... | G06T 3/4046 |
| | | | | 382/100 |

FOREIGN PATENT DOCUMENTS

CN            111401406 A   *   7/2020           G06K 9/6256

\* cited by examiner

*Primary Examiner* — Wei Wen Yang
(74) *Attorney, Agent, or Firm* — Locke Lord LLP; Tim Tingkang Xia, Esq.

(57) ABSTRACT

A system for three-dimensional geometric guided student-teacher feature matching includes a multi-modal teacher model configured to determine feature matching between a pair of RGB-D images, each RGB-D image being a combination of a RGB image and its corresponding depth image; a mono-modal student model configured to determine feature matching from the pair of RGB images and the teacher model, the teacher model guiding the student model to learn RGB-induced depth information for the feature matching on both coarse and fine levels; a coarse-level knowledge transfer loss function for determining loss of transferring coarse-level matching knowledge from the teacher model to the student model; and a fine-level knowledge transfer loss function for determining loss of transferring fine-level matching knowledge from the teacher model to the student model, wherein the fine-level knowledge transfer loss function guides the student model to learn a fine-level prediction distribution with priority.

18 Claims, 6 Drawing Sheets

SYSTEM FOR THREE-DIMENSIONAL GEOMETRIC GUIDED STUDENT-TEACHER FEATURE MATCHING (3DG-STFM)

FIELD OF THE INVENTION

The invention relates generally to image processing, and more particularly, to a system for three-dimensional geometric guided student-teacher feature matching (3DG-STFM) for establishing correspondences between overlapped images.

BACKGROUND OF THE INVENTION

Establishing correspondences between overlapped images is critical for many computer vision tasks including structure from motion (SfM), simultaneous localization and mapping (SLAM), visual localization, etc.

Most existing methods that tackle this problem follow the classical tri-stage pipeline, i.e., feature detection, feature description, and feature matching. To generate robust descriptors that are invulnerable to the illumination or viewpoint variations, both traditional hand-crafted feature descriptors, e.g., SIFT, SURF and BRISK, and deep network representation features are intensively studied. The point-to-point correspondences are produced by matching algorithm based on nearest neighbor search or learnable matching strategies.

A learning-based matching system, SuperGlue, built a densely connected graph between two sets of keypoints by leveraging a graph neural network (GNN). Geometric correlation of the keypoints and their visual features are integrated and exchanged within the GNN using the self and cross attention mechanism. However, those detector-based local feature matching algorithms only produced sparse keypoints, especially in low-texture regions.

Therefore, a heretofore unaddressed need exists in the art to address the aforementioned deficiencies and inadequacies.

SUMMARY OF THE INVENTION

In view of the aforementioned deficiencies and inadequacies in the existing methods, one objective of this invention is to provide a framework/architecture using RGB-induced depth information to improve local feature matching performance. Another objective of the invention is to provide a model compression system to train an efficient, light-weight model, so it consumes the less computation resource with high matching quality and accuracy. Particularly, the invention provides system for three-dimensional geometric guided student-teacher feature matching (3DG-STFM), a student-teacher learning framework, to transfer depth knowledge learned by a multi-modal teacher model to a mono-modal student model to improve the local feature matching.

In one aspect of the invention, the system comprises a multi-modal teacher model configured to determine feature matching between a pair of RGB-D images, wherein each RGB-D image is a combination of a RGB image and its corresponding depth image, and the depth image is an image channel in which each pixel relates to a distance between an image plane and a corresponding object in the RGB image; and a mono-modal student model configured to determine feature matching from the pair of RGB images and the teacher model, wherein the teacher model guides the student model to learn RGB-induced depth information for the feature matching on both coarse and fine levels.

The system also comprises a coarse-level knowledge transfer loss function for determining loss of transferring coarse-level matching knowledge from the teacher model to the student model; and a fine-level knowledge transfer loss function for determining loss of transferring fine-level matching knowledge from the teacher model to the student model, wherein the fine-level knowledge transfer loss function guides the student model to learn a fine-level prediction distribution with priority.

In one embodiment, each of the teacher model and the student model comprises a feature pyramid network (FPN) configured to extract coarse-level local features with ⅛ of an original image resolution and fine-level features with ½ of the original image resolution from the pair of images.

In one embodiment, the FPN of the teacher model is designed for 4-channel inputs of RGB-D images, and the FPN of the student model is designed for 3-channel inputs of RGB images, wherein D is depth information.

In one embodiment, each of the teacher model and the student model further comprises a coarse-level local feature transform module, a coarse-level matching module, and a fine-level matching module.

In one embodiment, the coarse-level local feature transform module is configured to flatten maps of the extracted coarse-level features to one-dimensional vectors; perform positional encoding on the flattened one-dimensional vectors to assign each feature entry a unique embedding vector in a sinusoidal format to encode spatial information; and process the encoded local feature vectors by a coarse-level matching transformer comprising self-attention and cross-attention layers to generate a logits layer comprising a correlation matrix.

In one embodiment, the self-attention and cross-attention layers are interleaved in the coarse-level matching transformer by $L_c$ times.

In one embodiment, the coarse-level matching module is configured to generate a confidence score matrix $P_c$ by applying a dual softmax operation to the correlation matrix $S_c$ on both row and column directions:

$$P_c(i,j) = \text{softmax}(S_c(i,\cdot)_j) * \text{softmax}(S_c(\cdot,j)_i)$$

wherein $P_c(i, j)$ is a matching probability at matching position $(i, j)$; and select matching pairs with probability scores higher than a threshold $\theta_c$ to yield coarse-level matching predictions.

In one embodiment, given the ground-truth matrix derived from correspondence labels, cross-entropy loss that measures the performance of the coarse-level local feature transform module and the coarse-level matching module is calculated as:

$$\mathcal{L}_c = -\tfrac{1}{|M_{gt}|}\sum_{gt} FL(P_c(i, j))\log(P_c)$$

$$FL(p) = \alpha(1 - \hat{p})^\gamma,$$

$$\hat{p} = \begin{cases} p & \text{if } y = 1, \\ 1 - p & \text{otherwise} \end{cases}$$

wherein $\mathcal{M}_{gt}$ is a correspondence set generated by the ground-truth labels, FL with a predicted probability p is a focal loss term for addressing imbalance between matching and unmatching pairs.

In one embodiment, the fine-level matching module is configured to project the coarse matching position $(i, j)$ on the fine-level feature map at position $(\hat{i}, \hat{j})$ and extract its features from a neighboring w×w size window as matching candidates; upsample the selected coarse-level features and concatenate the upsampled coarse-level features to the fine-level features; and process the concatenated fine-level features by a fine-level matching transformer to predict correspondences on subpixel-level.

In one embodiment, the fine-level matching transformer contains $L_f$ self-attention and cross-attention layers to aggregate fine-level local information and generate a heatmap distribution for the location refinement.

In one embodiment, the final loss based on the direct supervision is calculated by:

$$\mathcal{L}_f = \tfrac{1}{|\mathcal{M}_f|}\sum_{i,j\in\mathcal{M}_f} \frac{1}{\sigma^2(\hat{\imath})}\left\|\mu(\hat{\imath}) - \hat{\jmath}_{gt}\right\|_2^2$$

where $(\hat{\imath}, \hat{\jmath})$ is the ground-truth position wrapped from an image solution to a fine-level heatmap scale, $\mu(\hat{\imath})$ is the prediction associated to a coarse position $\hat{\imath}$, $\sigma^2(\hat{\imath})$ is the total variance of the heatmap distribution, and $\mathcal{M}_f$ is the set of fine matches predicted by the module.

In one embodiment, the total variance of the similarity distribution is treated as uncertainty to assign a weight to each fine-level match, and wherein the larger total variance indicates it is an uncertain prediction and associates with low weights.

In one embodiment, the coarse-level knowledge transfer loss function is adapted to decompose the logits layer to multiple independent query distributions and guides the student model to learn the distributions.

In one embodiment, the coarse-level knowledge transfer loss function determines a mutual query divergence (MQD) loss that employs all the mutual query distributions for knowledge transfer:

$$\mathcal{L}_{MQD} = -\frac{1}{n}\left[-\sum_{i=1}^{n} FL\!\left(p_S^{(i)}\right)\hat{p}_S^{(i)}\log\!\left(\hat{p}_T^{(i)}\right)\right]$$

$$\hat{p}_S^{(i)} = \frac{\exp\!\left(\frac{o_S^k}{T}\right)}{\sum_{k=1}^{L}\exp\!\left(\frac{o_S^k}{T}\right)}$$

$$\hat{p}_T^{(i)} = \frac{\exp\!\left(\frac{o_T^k}{T}\right)}{\sum_{k=1}^{L}\exp\!\left(\frac{o_T^k}{T}\right)}$$

$$p_S^{(i)} = \frac{\exp(o_S^k)}{\sum_{k=1}^{L}\exp(o_S^k)}$$

where $\hat{p}_S^{(i)}$ and $\hat{p}_T^{(i)}$ are respectively student's and teacher's query distributions distilled at temperature T, additional focal loss weight FL is added to balance the matching/unmatching ground-truth pairs, $p_S^{(i)}$ is the standard confidence score predicted by the student model, and the total MQD loss $\mathcal{L}_{MQD}$ on the coarse level is the mean of knowledge distillation (KD) loss of all n distributions, wherein n is equal to 2×hw.

In one embodiment, the fine-level knowledge transfer loss function is adapted to assign weights to the prediction of the teacher model, with the prediction with higher certainty is assigned with larger weights.

In one embodiment, the heatmaps of the teacher model and the student model are of Gaussian distributions $N_t(\mu_t, \sigma_t^2)$ and $N_s(\mu_s, \sigma_s^2)$, respectively.

In one embodiment, the fine-level knowledge transfer loss function determines an attentive loss ($\mathcal{L}_{att}$) that is applied to help the student model learn the Gaussian distributions:

$$\mathcal{L}_{att} = \tfrac{1}{|\mathcal{M}_f|}\sum \frac{1}{2\sigma_t^{(i)2}}\left(\mu_S^{(i)} - \mu_t^{(i)}\right)^2$$

where the $\mu_s^{(i)}$ and $\mu_t^{(i)}$ are the expectations of student's and teacher's output distributions which correspond to match $(\hat{\imath}, \hat{\jmath})$ in the fine-level correspondence set $\mathcal{M}_f$.

In one embodiment, the attentive loss is treated as a $l_2$ distance loss that pays more attention to the prediction associated with large attention weight $$\frac{1}{2\sigma_t^{(i)2}}.$$

In one embodiment, the teacher prediction with a small total variance indicates the teacher model is quite certain about the location of the correspondence, wherein the loss is assigned with a large weight to guide the student model to learn the certain predictions from the teacher model in priority.

In one embodiment, the final losses for the teacher model and the student model are respectively:

$$\mathcal{L}_{teacher} = \lambda_0 \mathcal{L}_c + \lambda_1 \mathcal{L}_f;\text{ and}$$

$$\mathcal{L}_{student} = \lambda_0 \mathcal{L}_c + \lambda_1 \mathcal{L}_f + \lambda_2 \mathcal{L}_{MQD} + \lambda_3 \mathcal{L}_{att}.$$

These and other aspects of the invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The systems and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Establishing correspondences between overlapped images is critical for many computer vision tasks including structure from motion (SfM), simultaneous localization and mapping (SLAM), visual localization, etc.

Several recent works attempted to avoid the detection step and established a fully-supervised dense matching by considering all points from a regular grid. NCNet proposed an end-to-end approach by directly learning the dense correspondences. It enumerated all possible matches between two images and constructed a 4D correlation tensor map. The 4D neighborhood consensus networks learned to identify reliable matching pairs and filtered out unreliable matches accordingly. Based on this concept, Sparse NCNet improved NCNet's efficiency and performance by processing the 4D correlation map with submanifold sparse convolutions. And DRC-Net proposed a coarse-to-fine approach to generate higher accuracy dense correspondences.

Recently, a local feature transformer (LoFTR) approach was proposed to learn global consensus between image correspondences by leveraging transformers. For memory efficiency, the coarse matching features were first predicted by a large LoFTR, then fed to a small LoFTR to produce the final fine-level matches. Benefited from the global receptive field of transformers, the LoFTR improved the matching performance by a large margin.

All above mentioned dense local feature matching approaches needed dense ground-truth correspondences as supervision. To find the pixel-level ground-truth correspondences, depth map, camera intrinsic, and extrinsic matrices are used for the calculation of point reprojections from one image to the other. On the other hand, given a set of images with dense correspondences, triangulation could easily reconstruct the 3D scene and depth maps. Therefore, depth information is implicitly provided by dense correspondence supervision.

However, to the best of our knowledge, none of the existing methods explored the depth modality to further improve their matching performance. Depth maps, unlike RGB images, provide 3D information, which depicts the geometry distribution in an explicit manner. The introduction of depth modality may provide two-fold benefits.

First, depth information, even if in lower quality or sparse, can remove lots of ambiguity in a 2D image space and enforce geometric consistency for feature matching, which is super difficult using only RGB inputs. That is particular true when there are multiple similar objects within the image pair. In that case, most of the existing methods tend to find implausible matching candidates since they purely discriminate 2D descriptors without depth or size knowledge. Second, a low texture area of single object haunts 2D descriptor in terms of enforcing dense and consistent matching. That deficiency can also be nicely regularized by leveraging the discrimination of depth modality.

Despite the advantage of depth information, high quality RGB-D inputs can only be collected in a well-controlled lab environment, and very few, especially low cost, consumer devices can capture similar well aligned RGB-D pairs in real world scenarios. Most of the imaging systems are only equipped with RGB sensor as input and cannot afford high computational cost stemmed from multi-modal inference.

That makes naive multi-modal fusion of RGB and depth inputs during both inference and training a restrictive solution. Consequently, a good way of transferring expensive RGB-D knowledge into pure RGB modality inference is needed in real world scenario, considering constraints from both hardware and computational load.

Student-teacher learning has been actively studied in knowledge transfer context including model compression, acceleration, and cross-modal knowledge transfer. Given a well-trained teacher model with heavy weight, the goal of the student-teacher learning is to distill and compresses the knowledge from the teacher and guides the lightweight student model for better performance. On the other hand, data with multiple modalities commonly provides more valuable supervisions than single modality data and could benefit model's performance. However, due to the lack of data or labels for some modalities during training or testing, it is important to transfer knowledge between different modalities.

In view of the aforementioned deficiencies and inadequacies in the existing methods, this invention provides a system/framework that, in contrast to the existing methods that use dense correspondence ground-truths as direct supervision for local feature matching training, trains 3DG-STFM: 3D Geometric Guided Student-Teacher Feature Matching, a multi-modal matching model (Teacher) to enforce the depth consistence under 3D dense correspondence supervision and transfer the knowledge to a 2D mono-modal matching model (Student). Each of the teacher and student models includes two transformer-based matching modules that obtain the dense correspondences in a coarse-to-fine manner. The teacher model guides the student model to learn RGB-induced depth information for the matching purpose on both coarse and fine branches. In one embodiment, the 3DG-STFM is evaluated on the model compression task. To the best of our knowledge, the 3DG-STFM is the first student-teacher learning method for the local feature matching task. The experiments show that the method outperforms state-of-the-art methods on indoor and outdoor camera pose estimations, and homography estimation problems.

Figure 1:
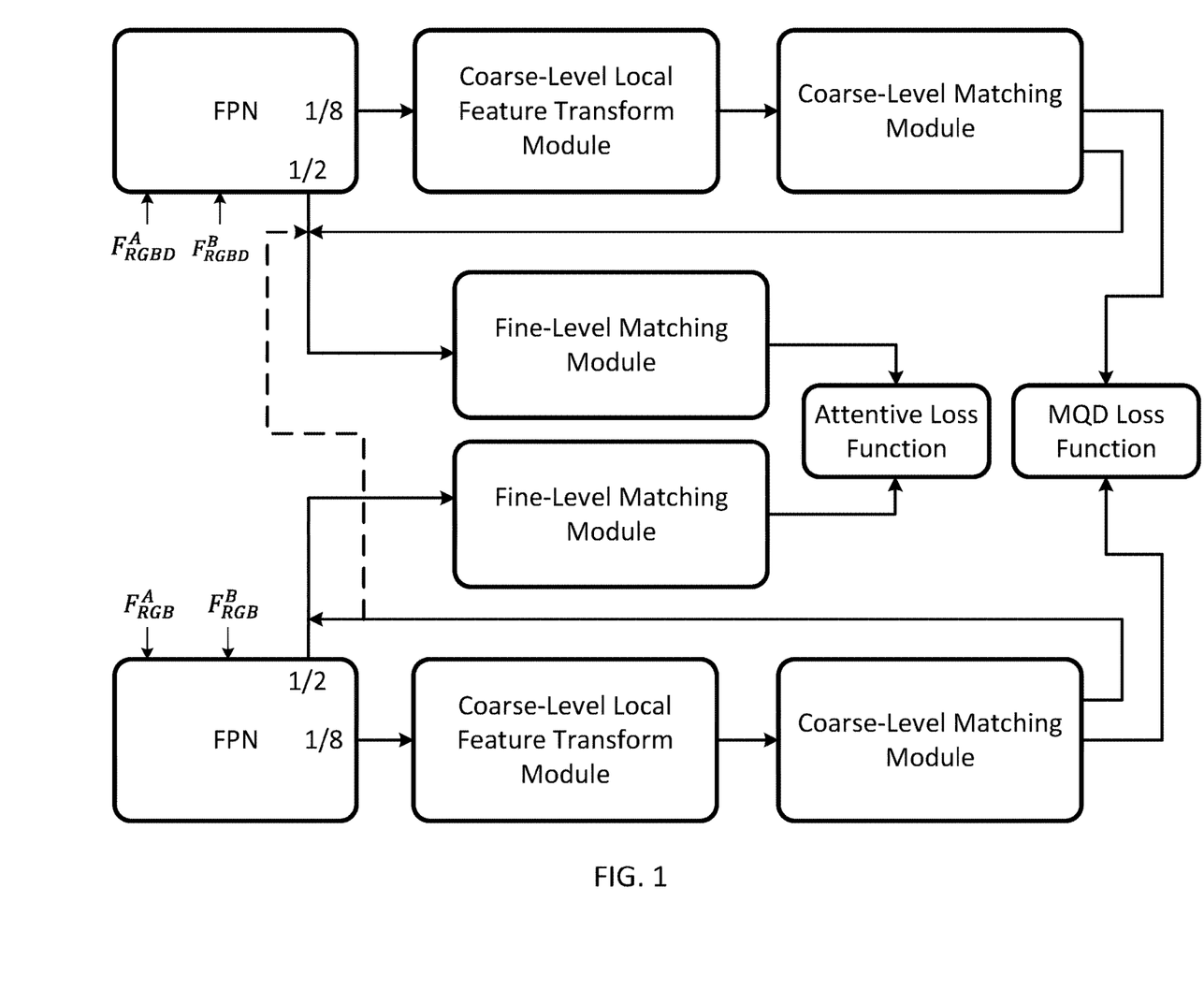
FIG. 1 shows schematically a system for three-dimensional geometric guided student-teacher feature matching (3DG-STFM) according to one embodiment of the invention.

Referring to FIG. 1, the student-teacher learning system in general comprises a multi-modal teacher model configured to determine feature matching between a pair of RGB-D images, wherein each RGB-D image is a combination of a RGB image and its corresponding depth image, and the depth image is an image channel in which each pixel relates to a distance between an image plane and a corresponding object in the RGB image; and a mono-modal student model configured to determine feature matching from the pair of RGB images and the teacher model, wherein the teacher model guides the student model to learn RGB-induced depth information for the feature matching on both coarse and fine levels.

In certain embodiments, each of the teacher model and the student model comprises a feature pyramid network (FPN) configured to extract coarse-level local features with ⅛ of an original image resolution and fine-level features with ½ of the original image resolution from the pair of images.

In certain embodiments, the FPN of the teacher model is designed for 4-channel inputs of RGB-D images, and the FPN of the student model is designed for 3-channel inputs of RGB images, wherein D is depth information.

In certain embodiments, each of the teacher model and the student model further comprises a coarse-level local feature transform module including a large transformer for coarse-level matching, a coarse-level matching module, and a fine-level matching module including small transformer for fine-level matching. The large transformer includes self-attention and cross-attention layers to aggregate those coarse-level local information and generate a confidence score matrix for coarse matching predictions. High score coarse matching is fed to the fine-level matching module for refinement. The small transformer includes self-attention and cross-attention layers to aggregate fine-level local information and generate a heatmap distribution for the location refinement.

The system also comprises a coarse-level knowledge transfer loss function for determining loss of transferring coarse-level matching knowledge from the teacher model to the student model; and a fine-level knowledge transfer loss function for determining loss of transferring fine-level matching knowledge from the teacher model to the student model, wherein the fine-level knowledge transfer loss function guides the student model to learn a fine-level prediction distribution with priority.

In certain embodiments, the locations of student model's coarse level selection are sent to teacher branch to extract teacher model's same location fine-level features.

In certain embodiments, the coarse-level knowledge transfer loss function include a mutual query divergence (MQD) loss to transfer the coarse-level matching knowledge from the teacher model to the student model. The MQD loss decomposes the logits layer to multiple independent query distributions and guide the student model to learn those distribution.

In certain embodiments, the fine-level knowledge transfer loss function includes an attentive loss to transfer the fine-level matching knowledge from the teacher model to the student model. The attentive loss assigns weights to teacher model's prediction. The prediction with higher certainty is assigned with larger weights. The attentive loss guides the student model to learn a fine-level prediction distribution with priority.

Figure 2:
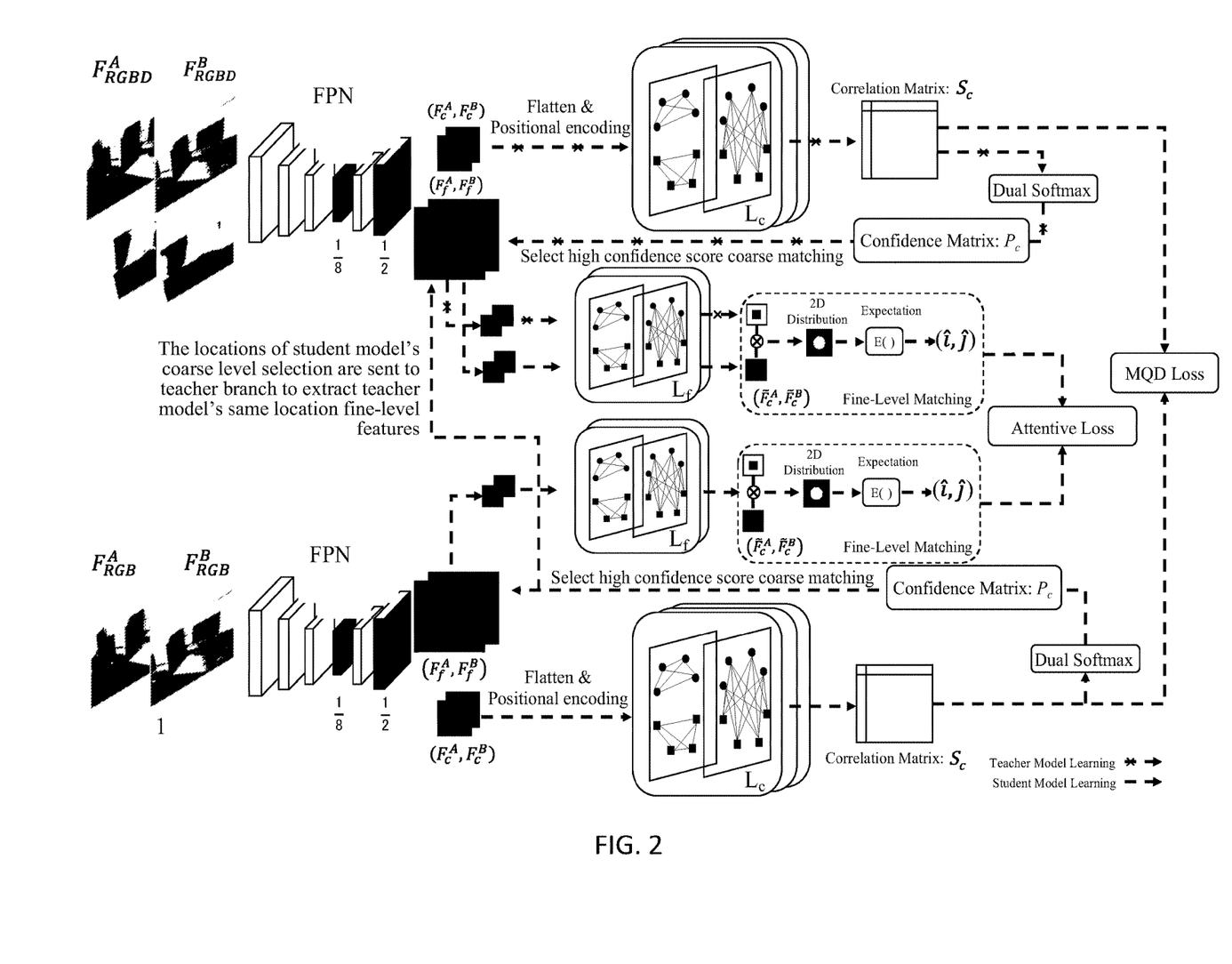
FIG. 2 shows schematically a system for 3DG-STFM according to one embodiment of the invention.

Referring to FIG. 2, one exemplary embodiment of the student-teacher learning system is shown according to the invention.

For each of the student and teacher models/branches, the FPN is used to extract coarse-level local features ($F_c^A$, $F_c^B$) and fine-level features ($F_f^A$, $F_f^B$) with ⅛ and ½ of the original image resolution from an image pair, ($F_{RGBD}^A$, $F_{RGBD}^B$) for the teacher branch and ($F_{RGB}^A$, $F_{RGB}^B$) for the student branch, as shown in FIG. 2. The input channel of the FPN of the teacher model is set to four channels to explore the additional depth map.

The coarse-level local feature transform modules are transformer-based matching modules on coarse levels for the matching purpose. In some embodiments, the coarse level feature dimension is ⅛ of input image. For example, the input RGB image is 640×640×3, the coarse feature is 80×80×c, where c is the number of channels of the feature map and depends on the deep network's structure. In one embodiment, the flatten (reshape) operation only applied on first two dimensions. Transformer-based architecture is adopted in the student-teacher learning system due to their high performance. The coarse-level feature map in dimension h×w×c is flatten into hw×c and the positional encoding assigns each feature entry a unique embedding vector in the sinusoidal format to encode their spatial information. The encoded local feature vector is fed to a coarse-level matching transformer. Unlike a classical vision transformer focusing on self-attention, the matching transformer adds a cross-attention layer to consider the relations between pixels from different images. The self-attention and cross-attention layers are interleaved in the matching transformer modules by $L_c$ times.

The coarse-to-fine modules are employed to reduce the computational cost, as shown in FIG. 2. The coarse-level predictions with high confidence scores is selected and mapped to a fine-level feature map. Surrounding features on ($F_f^A$, $F_f^B$) are collected by the w×w size window and fed to a lightweight fine-level transformer with $L_f$ self-attention and cross-attention layers. The fine-level matching module is applied to predict correspondences on subpixel-level.

Figure 3:
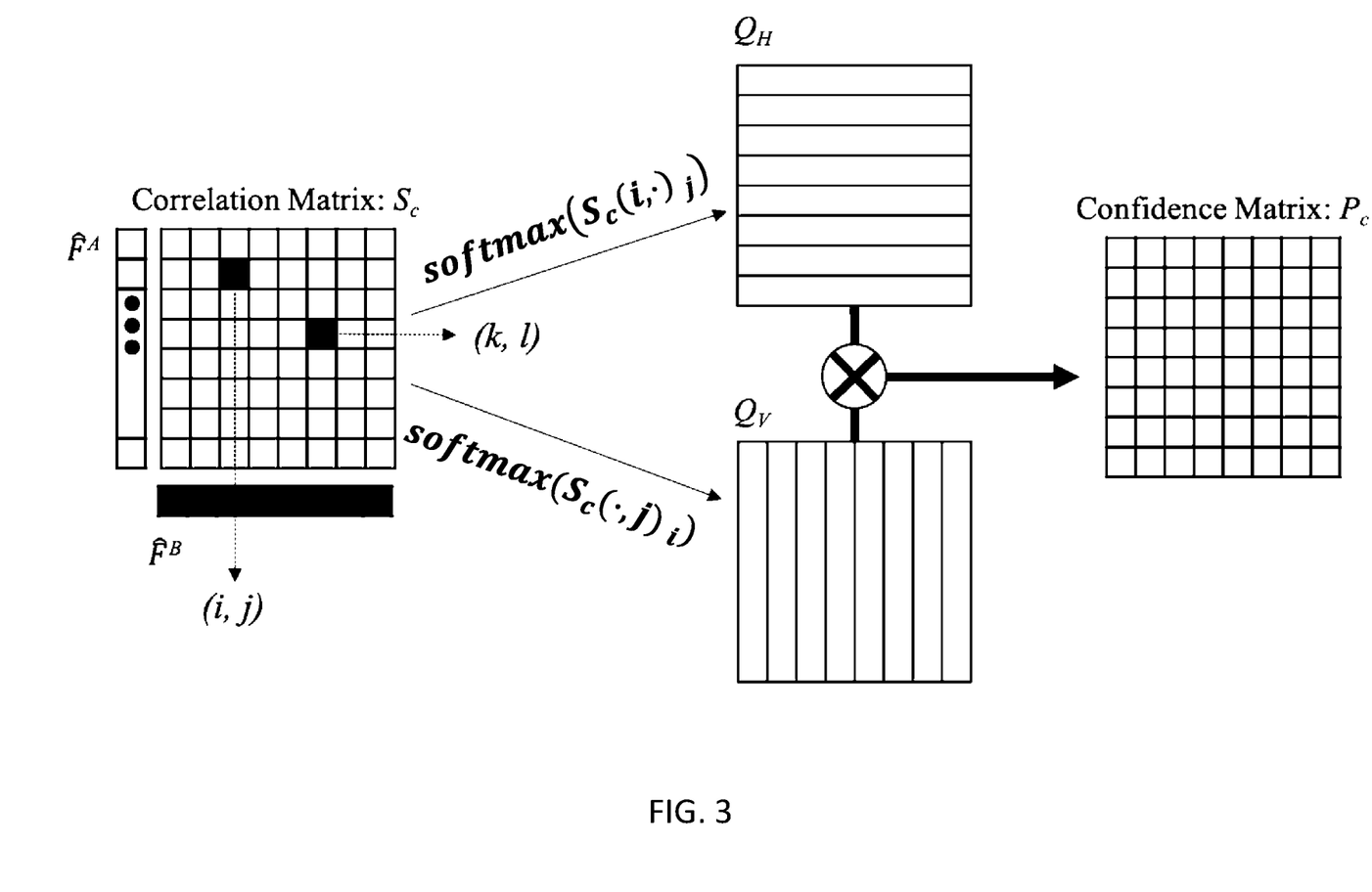
FIG. 3 shows schematically a coarse-level differentiable matching mechanism according to one embodiment of the invention.

For the coarse-level matching modules, FIG. 3 demonstrates the output of a logits layer, correlation matrix $S_c$ with size hw×hw, and the dual softmax operation is applied to generate confidence score matrix $P_c$:

$$P_c(i,j) = \text{softmax}(S_c(i,\cdot)_j) * \text{softmax}(S_c(\cdot,j)_i)$$

where the softmax is applied in both horizontal direction, $S_c(i,\cdot)_j$, and vertical direction, $S_c(\cdot,j)_i$, of correlation matrix $S_c$ and multiplied together as final matching probabilities. Given the ground-truth matrix derived from correspondence labels, the cross-entropy loss is calculated as follows:

$$\mathcal{L}_c = -\tfrac{1}{|\mathcal{M}_{gt}|} \sum_{i,j} FL(P_c(i,j)) \log(P_c)$$

$$FL(p) = \alpha(1-\hat{p})^\gamma,$$

$$\hat{p} = \begin{cases} p & \text{if } y = 1, \\ 1-p & \text{otherwise} \end{cases}$$

where $P_c$ is the confidence matrix, and $\mathcal{M}_{gt}$ is the correspondence set generated by the ground-truth labels. FL with a predicted probability p is a focal loss term used to address the imbalance between matching and unmatching pairs.

In certain embodiments, the locations of student model's coarse level selection are sent to teacher branch to extract teacher model's same location fine-level features.

For the fine-level matching modules, based on the confidence matrix $P_c$, matching pairs with probability scores higher than a threshold $\theta_c$ are selected and refined by the fine-level matching module. The coarse matching position (i, j) is projected on a fine-level feature map at position (î, ĵ) and its features are extracted from the neighboring w×w size window as matching candidates. The selected coarse-level features are upsampled and concatenated to the fine-level features before passing to the fine-level matching transformer. The fine-level matching transformer is a light-weight transformer containing $L_f$ attention layers to aggregate selected contextual information and passes to a differentiable matching module. Instead of generating a confidence matrix, the fine-level matching module selects the center feature of $\tilde{F}_f^A$ and correlates it with all features in $\tilde{F}_f^B$. The similarity distribution is generated and the expectation μ is treated as the prediction. The final loss based on the direct supervision is calculated by:

$$\mathcal{L}_f = \tfrac{1}{|\mathcal{M}_f|}\sum \frac{1}{\sigma^2(\hat{i})}\|\mu(\hat{i}) - \hat{j}_{gt}\|_2^2$$

where (î, ĵ) is the ground-truth position wrapped from an image solution to a fine-level heatmap scale. μ(î) is the prediction associated to coarse position î and $\sigma^2(\hat{i})$ is the total variance of the heatmap distribution. $\mathcal{M}_f$ is the set of fine matches predicted by the module. The total variance of the similarity distribution is treated as uncertainty to assign a weight to each fine-level match. The larger total variance indicates it is an uncertain prediction and associate with low weights.

For the coarse-level knowledge transfer loss, a response-based knowledge distillation strategy is applied to help the student learn from the teacher on a coarse level. This method distills the logits layer's distribution and guides the student to learn. FIG. 3 demonstrates the logits layer's output, correlation matrix $S_c$ with size hw×hw. Each row or column depicts the relation between one pixel and each pixel of the other image.

Figure 4:
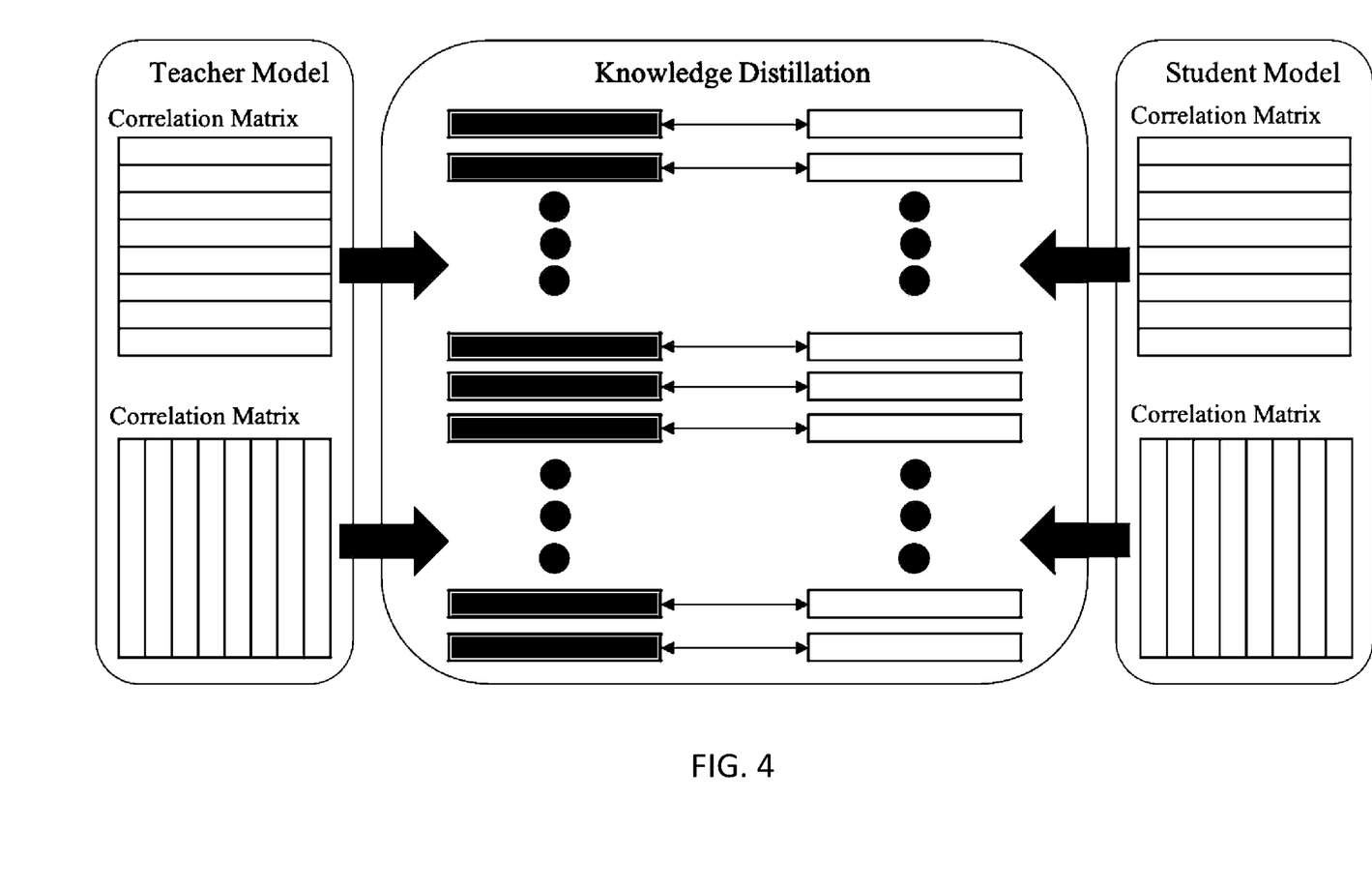
FIG. 4 shows schematically a coarse-level knowledge transfer according to one embodiment of the invention.

The dual softmax operation could be treated as a query process in two directions. As shown in FIG. 4, the correlation matrix is decomposed into two matching query matrixes. Mutual query divergence (MQD) loss employs all 2×hw mutual query distributions for knowledge transfer:

$$\mathcal{L}_{MQD} = -\frac{1}{n}\left[-\sum_{i=1}^{n} FL(p_S^{(i)})\hat{p}_S^{(i)}\log(\hat{p}_T^{(i)})\right]$$

$$\hat{p}_S^{(i)} = \frac{\exp\left(\frac{o_S^k}{T}\right)}{\sum_{k=1}^{L}\exp\left(\frac{o_S^k}{T}\right)}$$

$$\hat{p}_T^{(i)} = \frac{\exp\left(\frac{o_T^k}{T}\right)}{\sum_{k=1}^{L}\exp\left(\frac{o_T^k}{T}\right)}$$

$$p_S^{(i)} = \frac{\exp(o_S^k)}{\sum_{k=1}^{L}\exp(o_S^k)}$$

where $\hat{p}_S^{(i)}$ and $\hat{p}_T^{(i)}$ are student and teacher's query distributions distilled at temperature T. Additional focal loss weight FL is added to balance the matching/unmatching ground-truth pairs. $p_S^{(i)}$ is the standard confidence score predicted by the student model. The total MQD loss LAND on the coarse level is the mean of knowledge distillation (KD) loss of all n distributions, where n is equal to 2×hw.

Figure 5:
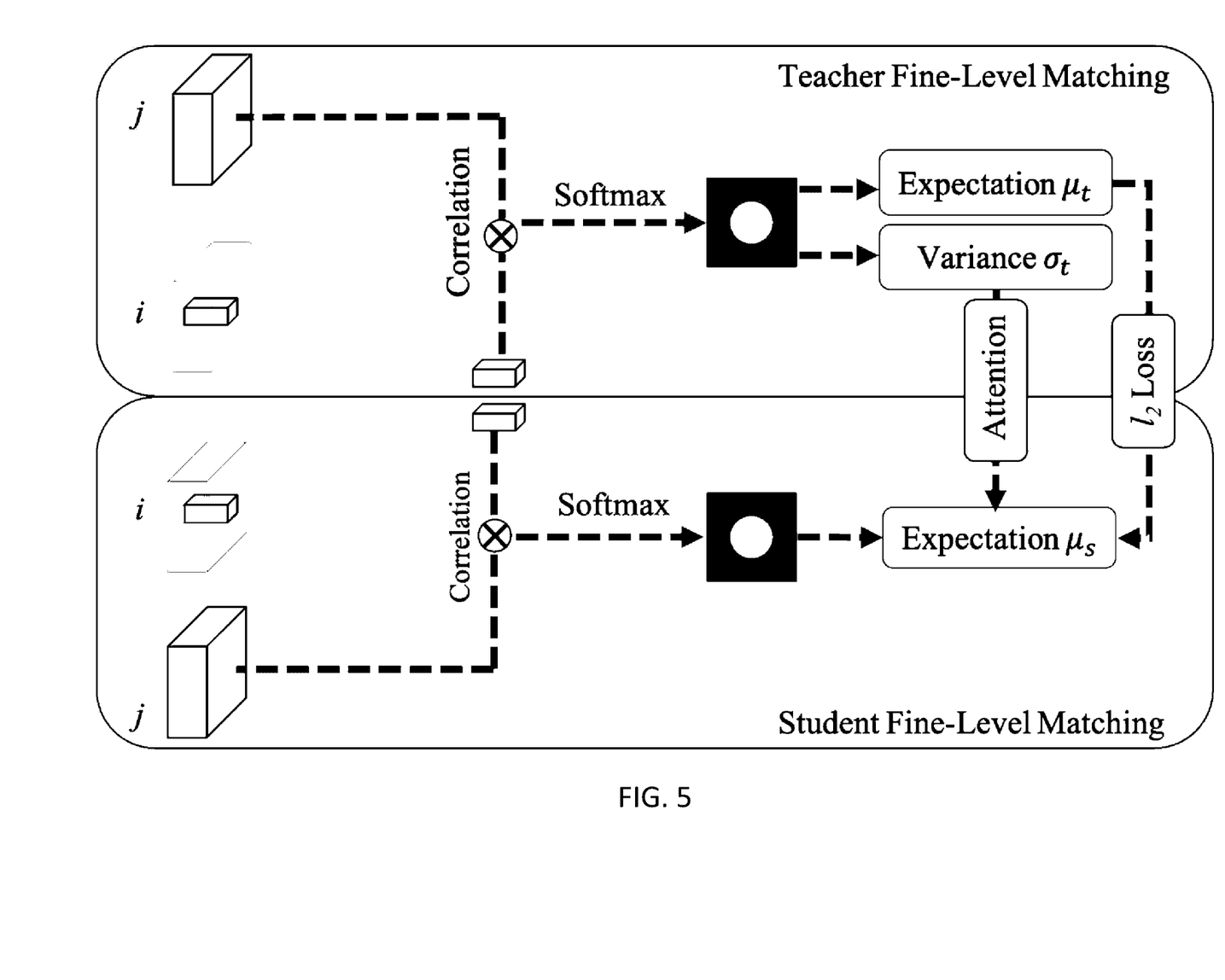
FIG. 5 shows schematically a fine-level attentive knowledge transfer according to one embodiment of the invention.

For the fine-level knowledge transfer loss, FIG. 5 demonstrates the fine-level knowledge transfer. During the student-teacher learning process, both teacher and student branches could generate heatmaps. In some embodiments, the heatmaps of the teacher model and the student model are treated as Gaussian distributions $N_t(\mu_t, \sigma_t^2)$ and $N_s(\mu_s, \sigma_s^2)$. The attentive loss ($\mathcal{L}_{att}$) is applied to help the student learn the distribution:

$$\mathcal{L}_{att} = \tfrac{1}{|\mathcal{M}_f|}\sum \frac{1}{2\sigma_t^{(i)2}}\left(\mu_S^{(i)} - \mu_t^{(i)}\right)^2$$

where the $\mu_s^{(i)}$ and $\mu_t^{(i)}$ are the expectations of student's and teacher's output distributions which correspond to match (î, ĵ) in the fine-level correspondence set $\mathcal{M}_f$.

Therefore, the total loss is a mean of the weighted sum of all the fine-level pairs' $l_2$ loss in the matching set $\mathcal{M}_f$. In some embodiments, the attentive loss is treated as a $l_2$ distance loss that pays more attention to the prediction associated with large attention weight $$\frac{1}{2\sigma_t^{(i)2}}.$$

The total variance is commonly treated as a metric for certainty measure. The teacher prediction with a small total variance indicates the teacher is quite certain about the location of the correspondence. In this case, the loss is assigned with a large weight to guide the student model to learn those certain predictions from the teacher in priority.

Both teacher and student training processes are under the direct supervision provided by correspondence ground-truths. The teacher model provides extra supervision during the student model training. The final losses for the teacher model and the student model are respectively:

$$\mathcal{L}_{teacher} = \lambda_0 \mathcal{L}_c + \lambda_1 \mathcal{L}_f; \text{ and}$$

$$\mathcal{L}_{student} = \lambda_0 \mathcal{L}_c + \lambda_1 \mathcal{L}_f + \lambda_2 \mathcal{L}_{MQD} + \lambda_3 \mathcal{L}_{att}.$$

It should be noted that the student-teacher learning system may also include electronics, at least one processor operatively coupled to the electronics, and at least one memory operatively coupled to the at least one processor and being configured to store processor-executable instructions, which when executed by the at least one processor cause the system to perform the 3D geometric guided student-teacher feature matching, for example, determining, by the multi-modal teacher model, feature matching between a pair of RGB-D images, each RGB-D image being a combination of a RGB image and its corresponding depth image, the depth image being an image channel in which each pixel relates to a distance between an image plane and a corresponding object in the RGB image; determining, by the mono-modal student model, feature matching from the pair of RGB images and the teacher model, wherein the teacher model guides the student model to learn RGB-induced depth information for the feature matching on both coarse and fine levels; determining, by the coarse-level knowledge transfer loss function, loss of transferring coarse-level matching knowledge from the teacher model to the student model; and determining, by the fine-level knowledge transfer loss function, loss of transferring fine-level matching knowledge from the teacher model to the student model, wherein the fine-level knowledge transfer loss function guides the student model to learn a fine-level prediction distribution with priority.

Further, each of the teacher model and the student model itself may also include electronics, one or more processors operatively coupled to the electronics, and one or more memories coupled to the one or more processors and being configured to store processor-executable instructions, which when executed by the one or more processor cause the one or more processors to perform feature extraction, local feature transforms and matching, and so on. The teacher model may include a teacher network and the student model may include a student network.

In addition, the system may be configured to operably communicate wirelessly or wired with other devices such as mobile devices, servers, databases or data centers, clouds, etc. Moreover, the system may also include a display for displaying the results and/or a graphical user interface (GUI) for interactions between users and the system.

Figure 6:
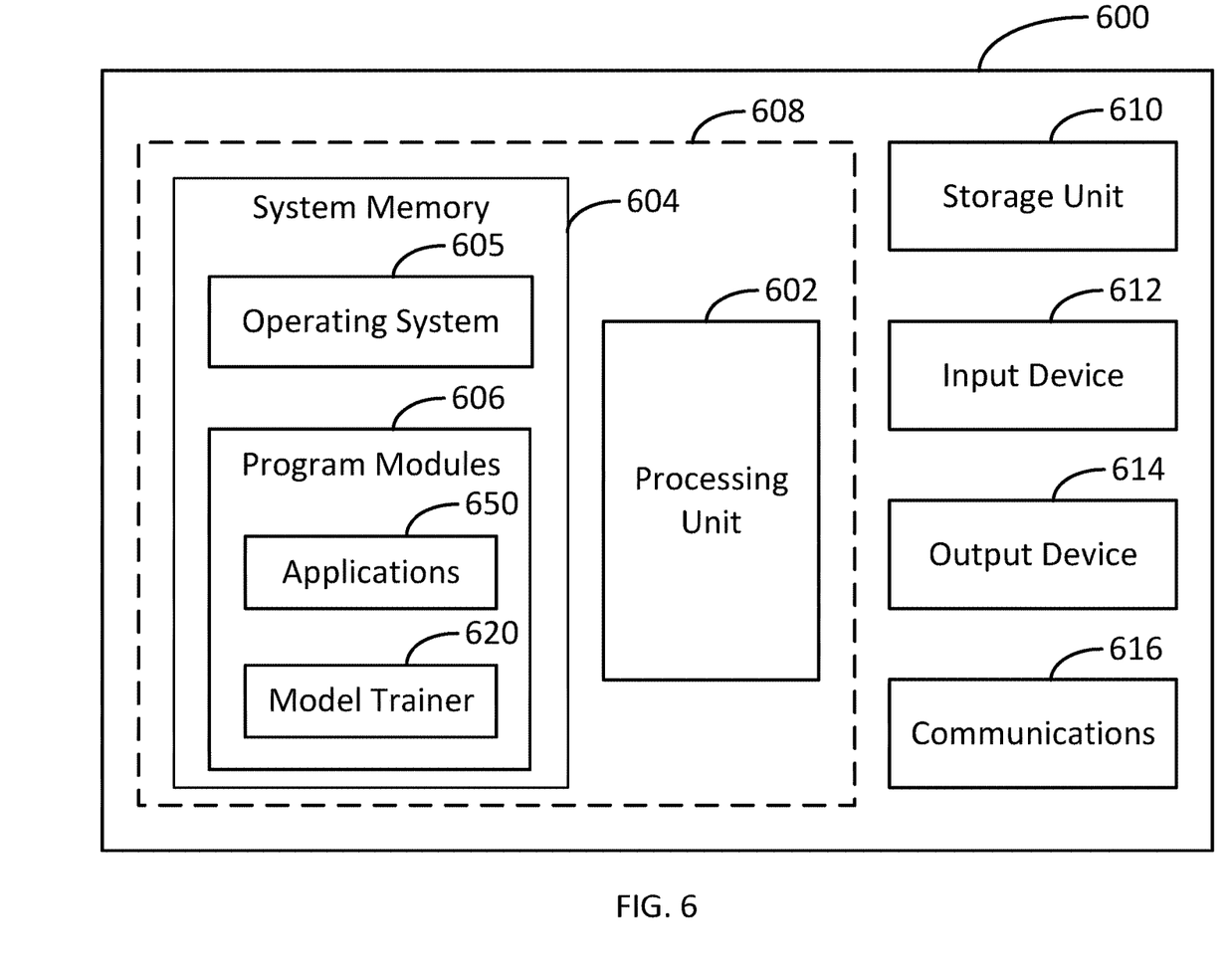
FIG. 6 is shows schematically a block diagram of the system according to one embodiment of the invention.

FIG. 6 is an exemplary block diagram illustrating physical components (i.e., hardware) of the system 600 with which examples of the invention may be practiced. However, the devices and systems illustrated and discussed with respect to FIG. 6 are for purposes of example and illustration and are not limiting of other device configurations that are used for practicing the invention. In the basic configuration 608, the system 600 includes at least one processing unit 602 and a system memory 604. In some embodiment, the system memory 604 comprises, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650. The system memory 604 also includes model trainer 620 for training the teacher model and the student model. In addition, the system 600 may have additional features or functionality, and may include additional data storage devices (removable and/or non-removable) 610 such as, for example, magnetic disks, optical disks, or tape.

In some embodiments, program modules and data files are stored in the system memory 604. While executing on the processing unit 602, the program modules 606 (e.g., model trainer 620) perform processes as illustrated in FIGS. 2-5.

In some embodiments, the system 600 may also include one or more input devices 612 and an output device 614 such as a display. Further, the system 600 may include communication protocols 616 allowing wireless and/or wired communications with other devices.

Yet another aspect of the invention provides a non-transitory tangible computer-readable medium storing instructions that when executed by one or more processors enable the student-teach system to perform three-dimensional geometric guided student-teacher feature matching (3DG-STFM). The computer executable instructions or program codes enable the above disclosed apparatus or a similar system to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

These and other aspects of the invention are further described below. Without intent to limit the scope of the invention, exemplary instruments, apparatus, methods, and their related results according to the embodiments of the invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLES

The following exemplary examples/experiments show that the method outperforms state-of-the-art methods on indoor and outdoor camera pose estimations, and homography estimation problems. Specifically, given two different cameras A and B, a relative camera pose matrix E depicts the 3D relative orientation and location of camera B in world coordinates, defined for reference camera A. Once we estimate sufficient correspondence between two images taken by these two cameras, we could regress the camera pose matrix. The more reliable correspondences we found in the pair of images, the more accurate pose estimations we could establish. Therefore, camera pose estimation is a good evaluation method for the local feature matching task. These experimental data show that RGBD model outperforms vanilla RGB model and student RGB model could learning from the teacher model and get better performance as well.

In the exemplary example, the novel approach of this invention is evaluated on camera pose estimation task on indoor and outdoor datasets, which is listed in Table 1. LoFTR [1] is the current state-of-the-art method and treated as baseline for comparison. The results show the AUC (area under the curve) of the pose error at thresholds (5°, 10°, 20°). The pose error is defined as the maximum of angular error in rotation and translation.

TABLE 1

Camera pose estimation task on indoor and outdoor datasets

| Method | Dataset | AUC@5° | AUC@10° | AUC@20° |
|---|---|---|---|---|
| LoFTR [1] | Indoor [2] | 22.06% | 40.80% | 57.62% |
| This Invention | Indoor [2] | 23.58% | 43.60% | 61.17% |
| LoFTR [1] | Outdoor [3] | 47.50% | 64.50% | 77.08% |
| This Invention | Outdoor [3] | 47.98% | 64.97% | 77.77% |

Table 2 shows comparisons among the teacher (RGBD) model, student model, vanilla RGB model on indoor/outdoor datasets.

TABLE 2

Comparisons among the teacher (RGBD) model, student model, vanilla RGB model on indoor/outdoor datasets

| Method | Dataset | AUC@5° | AUC@10° | AUC@20° |
|---|---|---|---|---|
| Teacher Model | Indoor [2] | 27.93% | 47.11% | 63.47% |
| Vanilla RGB Model | Indoor [2] | 22.06% | 40.80% | 57.62% |
| Student Model | Indoor [2] | 23.58% | 43.60% | 61.17% |
| Teacher Model | Outdoor [3] | 50.05% | 66.76% | 79.21% |
| Vanilla RGB Model | Outdoor [3] | 47.50% | 64.50% | 77.08% |
| Student Model | Outdoor [3] | 47.98% | 64.97% | 77.77% |

The results listed in Table 2 indicates that both the 3DG-STFM teacher and student models show better performance than vanilla mono-modal competitors for both indoor and outdoor dataset. The depth modality can remove lots of ambiguity in 2D image space and enforce geometric consistency for feature matching. However, during the inference time, depth modality is not always available since most of imaging systems are only equipped with RGB sensor. The results in the table also prove the student RGB model learn from the teacher model and outperform vanilla RGB model.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

REFERENCE LIST

[1]. Sun, Jiaming, et al. "LoFTR: Detector-free local feature matching with transformers." *Proceedings of the IEEE/CVF conference on computer vision and pattern recognition.* 2021.

[2]. Dai, Angela, et al. "Scannet: Richly-annotated 3d reconstructions of indoor scenes." *Proceedings of the IEEE conference on computer vision and pattern recognition.* 2017.

[3]. Li, Zhengqi, and Noah Snavely. "Megadepth: Learning single-view depth prediction from internet photos." *Proceedings of the IEEE Conference on Computer Vision and Pattern Recognition.* 2018.

What is claimed is:

1. A system for three-dimensional geometric guided student-teacher feature matching (3DG-STFM), comprising:
   a multi-modal teacher model configured to determine feature matching between a pair of RGB-D images; wherein each RGB-D image is a combination of a RGB image and its corresponding depth image, wherein the depth image is an image channel in which each pixel relates to a distance between an image plane and a corresponding object in the RGB image;
   a mono-modal student model configured to determine feature matching from the pair of RGB images and the teacher model, wherein the teacher model guides the student model to learn RGB-induced depth information for the feature matching on both coarse and fine levels;
   a coarse-level knowledge transfer loss function for determining loss of transferring coarse-level matching knowledge from the teacher model to the student model; and
   a fine-level knowledge transfer loss function for determining loss of transferring fine-level matching knowledge from the teacher model to the student model, wherein the fine-level knowledge transfer loss function guides the student model to learn a fine-level prediction distribution with priority,
   wherein each of the teacher model and the student model comprises:
      a feature pyramid network (FPN) configured to extract coarse-level local features with ⅛ of an original image resolution and fine-level features with ½ of the original image resolution from the pair of images; and
      a coarse-level local feature transform module configured to
         flatten maps of the extracted coarse-level features to one-dimensional vectors;
         perform positional encoding on the flattened one-dimensional vectors to assign each feature entry a unique embedding vector in a sinusoidal format to encode spatial information; and
         process the encoded local feature vectors by a coarse-level matching transformer comprising self-attention and cross-attention layers to generate a logits layer comprising a correlation matrix.

2. The system of claim 1, wherein the FPN of the teacher model is designed for 4-channel inputs of RGB-D images, and the FPN of the student model is designed for 3-channel inputs of RGB images, wherein D is depth information.

3. The system of claim 1, wherein each of the teacher model and the student model further comprises a coarse-level matching module, and a fine-level matching module.

4. The system of claim 1, wherein the self-attention and cross-attention layers are interleaved in the coarse-level matching transformer by $L_c$ times.

5. The system of claim 3, wherein the coarse-level matching module is configured to
   generate a confidence score matrix $P_c$ by applying a dual softmax operation to the correlation matrix $S_c$ on both row and column directions:

$$P_c(i,j) = \text{softmax}(S_c(i,\cdot)_j) * \text{softmax}(S_c(\cdot,j)_i)$$

wherein $P_c(i, j)$ is a matching probability at matching position (i, j); and
   select matching pairs with probability scores higher than a threshold $\theta_c$ to yield coarse-level matching predictions.

6. The system of claim 5, wherein given the ground-truth matrix derived from correspondence labels, cross-entropy loss that measures the performance of the coarse-level local feature transform module and the coarse-level matching module is calculated as:

$$\mathcal{L}_c = -\frac{1}{|P_c^{gt}|} \sum_{i,j \in P_c^{gt}} FL(P_c(i,j)) \log(P_c)$$

$$FL(p) = \alpha(1-\hat{p})^\gamma,$$

$$\hat{p} = \begin{cases} p & \text{if } y = 1, \\ 1-p & \text{otherwise} \end{cases}$$

wherein $\mathcal{M}_{gt}$ is a correspondence set generated by the ground-truth labels, FL with a predicted probability p is a focal loss term for addressing imbalance between matching and unmatching pairs.

7. The system of claim 5, wherein the fine-level matching module is configured to
    project the coarse matching position (i, j) on the fine-level feature map at position (î,ĵ) and extract its features from a neighboring w×w size window as matching candidates;
    upsample the selected coarse-level features and concatenate the upsampled coarse-level features to the fine-level features; and
    process the concatenated fine-level features by a fine-level matching transformer to predict correspondences on subpixel-level.

8. The system of claim 7, wherein the fine-level matching transformer contains $L_f$ self-attention and cross-attention layers to aggregate fine-level local information and generate a heatmap distribution for the location refinement.

9. The system of claim 7, wherein the final loss based on the direct supervision is calculated by:

$$\mathcal{L}_f = \tfrac{1}{|\mathcal{M}_f|}\sum \frac{1}{\sigma^2(\hat{i})}\|\mu(\hat{i}) - \hat{\jmath}_{gt}\|_2^2$$

where (î,ĵ) is the ground-truth position wrapped from an image solution to a fine-level heatmap scale, $\mu(\hat{i})$ is the prediction associated to a coarse position î, $\sigma^2(\hat{i})$ is the total variance of the heatmap distribution, and $\mathcal{M}_f$ is the set of fine matches predicted by the module.

10. The system of claim 9, wherein the total variance of the similarity distribution is treated as uncertainty to assign a weight to each fine-level match, and wherein the larger total variance indicates it is an uncertain prediction and associates with low weights.

11. The system of claim 5, wherein the coarse-level knowledge transfer loss function is adapted to decompose the logits layer to multiple independent query distributions and guides the student model to learn the distributions.

12. The system of claim 11, wherein the coarse-level knowledge transfer loss function determines a mutual query divergence (MQD) loss that employs all the mutual query distributions for knowledge transfer:

$$\mathcal{L}_{MQD} = -\frac{1}{n}\left[-\sum_{i=1}^{n} FL(p_S^{(i)})\hat{p}_S^{(i)}\log(\hat{p}_T^{(i)})\right]$$

$$\hat{p}_S^{(i)} = \frac{\exp\left(\frac{o_S^k}{T}\right)}{\sum_{k=1}^{L}\exp\left(\frac{o_S^k}{T}\right)}$$

-continued $$\hat{p}_T^{(i)} = \frac{\exp\left(\frac{o_T^k}{T}\right)}{\sum_{k=1}^{L}\exp\left(\frac{o_T^k}{T}\right)}$$

$$p_S^{(i)} = \frac{\exp(o_S^k)}{\sum_{k=1}^{L}\exp(o_S^k)}$$

where $\hat{p}_S^{(i)}$ and $\hat{p}_T^{(i)}$ are respectively student's and teacher's query distributions distilled at temperature T, additional focal loss weight FL is added to balance the matching/unmatching ground-truth pairs, $p_S^{(i)}$ is the standard confidence score predicted by the student model, and the total MQD loss $\mathcal{L}_{MQD}$ on the coarse level is the mean of knowledge distillation (KD) loss of all n distributions, wherein n is equal to 2×hw.

13. The system of claim 7, wherein the fine-level knowledge transfer loss function is adapted to assign weights to the prediction of the teacher model, with the prediction with higher certainty is assigned with larger weights.

14. The system of claim 13, wherein the heatmaps of the teacher model and the student model are of Gaussian distributions $N_t(\mu_t, \sigma_t^2)$ and $N_s(\mu_s,\sigma_s^2)$, respectively.

15. The system of claim 14, wherein the fine-level knowledge transfer loss function determines an attentive loss ( $\mathcal{L}_{att}$) that is applied to help the student model learn the Gaussian distributions:

$$\mathcal{L}_{att} = \tfrac{1}{|\mathcal{M}_f|}\sum \frac{1}{2\sigma_t^{(i)2}}\left(\mu_s^{(i)} - \mu_t^{(i)}\right)^2$$

where the $\mu_s^{(\hat{i})}$ and $\mu_t^{(\hat{i})}$ are the expectations of student's and teacher's output distributions which correspond to match (î,ĵ) in the fine-level correspondence set $\mathcal{M}_f$.

16. The system of claim 15, wherein the attentive loss is treated as a $l_2$ distance loss that pays more attention to the prediction associated with large attention weight $$\frac{1}{2\sigma_t^{(i)2}}.$$

17. The system of claim 15, wherein the teacher prediction with a small total variance indicates the teacher model is quite certain about the location of the correspondence, wherein the loss is assigned with a large weight to guide the student model to learn the certain predictions from the teacher model in priority.

18. The system of claim 15, wherein the final losses for the teacher model and the student model are respectively:

$\mathcal{L}_{teacher} = \lambda_0 \mathcal{L}_c + \lambda_1 \mathcal{L}_f$; and $\mathcal{L}_{student} = \lambda_0 \mathcal{L}_c + \lambda_1 \mathcal{L}_f + \lambda_2 \mathcal{L}_{MQD} + \lambda_3 \mathcal{L}_{att}$.

\* \* \* \* \*